March 26, 1968    W. E. MARSHALL    3,375,099
PRODUCTION OF IRON FROM PELLETIZED IRON ORES
Filed June 30, 1964
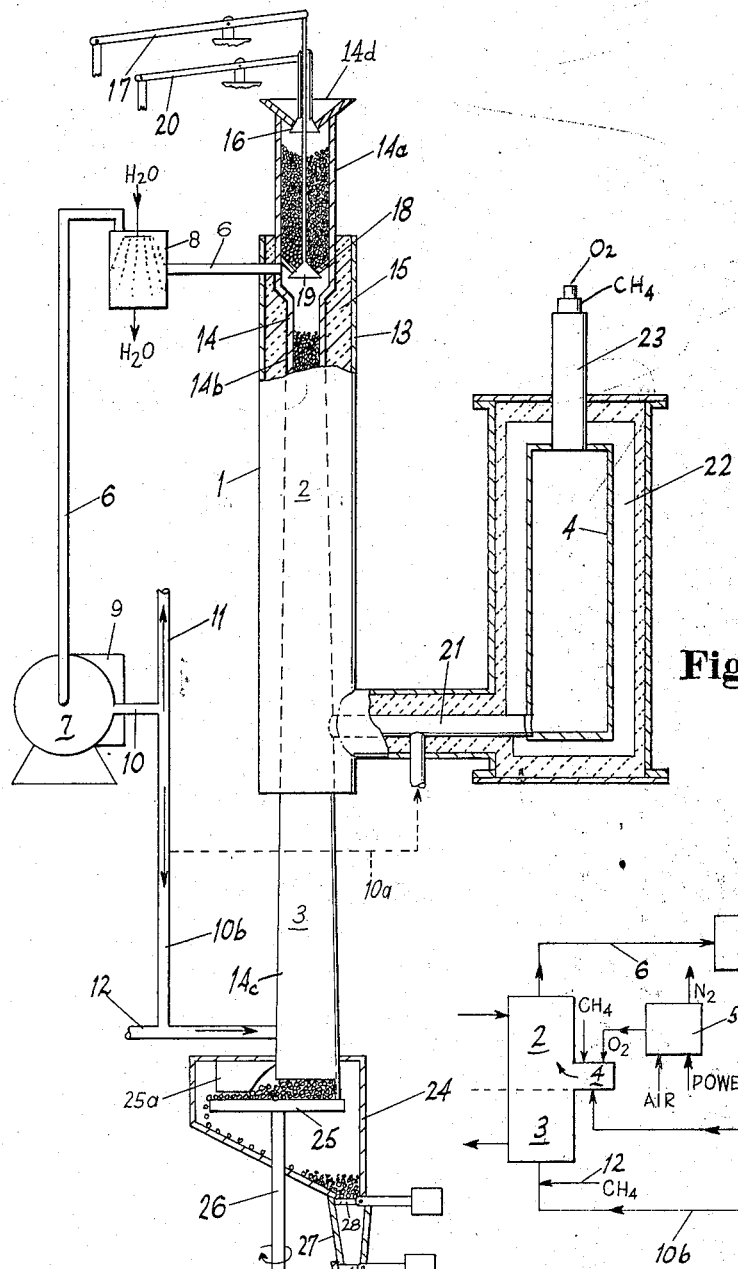
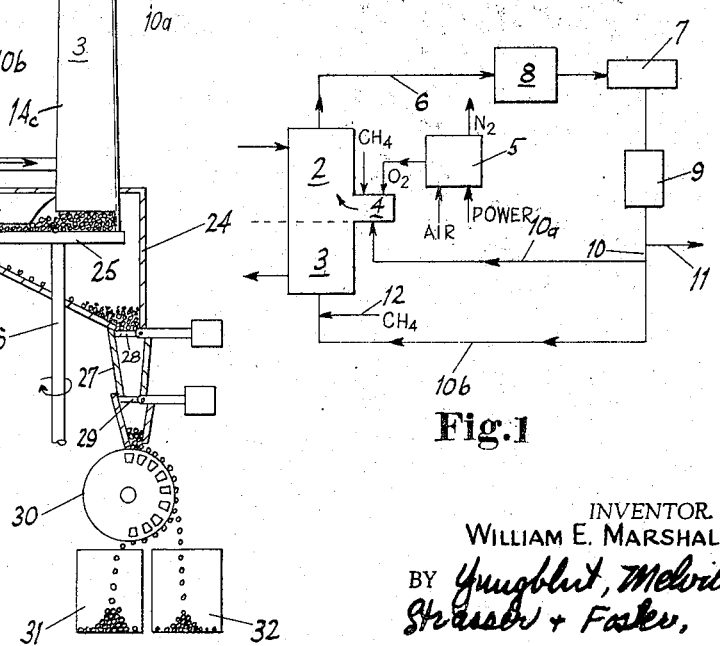
Fig. 2
Fig. 1
INVENTOR.
WILLIAM E. MARSHALL,
BY Youngblut, Melville,
Strasser + Foster,
ATTORNEYS.

United States Patent Office 3,375,099
Patented Mar. 26, 1968

3,375,099
PRODUCTION OF IRON FROM PELLETIZED
IRON ORES
William E. Marshall, Middletown, Ohio, assignor to Armco Steel Corporation, Middletown, Ohio, a corporation of Ohio
Filed June 30, 1964, Ser. No. 379,282
2 Claims. (Cl. 75—35)

As is well known, the recovery of iron from iron ores is usally carried on in the blast furnace, which is shaft furnace into which the iron ore, coke, and limestone are introduced at the top, and from which liquid iron and slag are tapped at the bottom at intervals of a few hours. A blast of preheated air is introduced through tuyeres located in the lower part of the furnace. The oxygen of the air unites with the coke to form carbon monoxide which in turn reduces the iron ore, with the freeing of the iron and the formation of carbon dioxide. The freed iron is melted by the heat of the reaction.

The successful operation of the blast furnace requires good quality coke of uniform lump size; and it either requires graded, good quality iron ore in lump form, or artificially formed agglomerates such as sinter or substantially uniformly sized pellets made from beneficiated iron ore.

High quality lump iron ores and blast furnace coke are becoming increasingly expensive, and in some areas are in short supply. It has hitherto been understood that if iron ores could be subjected to reduction in a suitable reactor by means of reducing gases elsewhere generated, the rigid requirement for high grade lump ore could be circumvented, and no blast furnace coke need be used at all. The gaseous media for the reduction of the iron ore could be generated by the partial combustion of any mobile fuel including natural or artificial combustible gases, hydrocarbon fuels of liquid character, and in some instances powdered coke or coal. In some areas, particularly near oil fields, there is an abundant and relatively cheap supply of natural gas, whereas such areas may be remote from any source of high grade lump ore or coal suitable for the preparation of high grade coke. It has been suggested that the ore itself might be in finely divided form, and that the direct gaseous reduction be carried on in a reactor in which the finely divided ore was maintained by the gases in a "fluidized" condition. A certain amount of success has attended the following of these suggestions; but attempts to carry on gaseous reduction and melting of the free iron have presented numerous difficulties, while attempts to reduce finely divided iron ores in a fluo-solids reactor often are unsatisfactory because some ores are difficult to fluidize.

The artificially formed pellets of beneficiated iron ores, to which reference has been made above, are generally formed from taconites, a relatively inferior although abundant iron ore material. The taconites, which are high in silica or other gangue materials, contain magnetic iron oxide. Thus it is possible to crush the taconites to a very finely divided condition, and beneficiate the ore by magnetic separation. The beneficiated or rich material can then be formed into pellets or pieces of a sufficient size for use in a blast furnace, in various ways, (see Proceedings of the Blast Furnace and Raw Materials Committee of the A.I.M.M.E., vol. 4, 1944, pp. 46 to 65). The ore is regularly formed into spherical pellets having a diameter of about 3/8 inch and having sufficient durability for handling, shipment, storage and use in a blast furnace. Pellets are made containing as much as 67% iron and as little as 1.5% silica or other gangue material. It is generally possible to make these pellets at a cost, on the basis of their iron content, comparable to the cost of blast furnace ore. The use of these pellets in the blast furnace has been very successful.

The present invention has to do with the direct gaseous reduction of pellets of this general nature. In the process herein described blast furnace coke is not required, and the ore cost per unit of recovered iron should not be substantially greater than the cost of blast furnace ore. The process herein described is not a smelting process because the reduced iron is not melted in the process itself; but is has been found that pellets of the type referred to can be subjected to direct gaseous reduction without disintegration. The degree of reduction achieved in the process is at least about 97% to 98%. The reduced pellets are delivered at a temperature below the oxidation temperature in air, and the reduced pellets are well suited for use as melting stock, as for example in the electric furnace. The skilled worker will understand that in many areas where pig metal is uavailable, iron and steel products are made by melting scrap in the electric furnace. Such remelted scrap is generally contaminated with tramp metals, and the product of this invention is useful for diluting the tramp metals in such scrap melts, as well as for the purpose of replacing scrap where economics permit.

The actual reduction of the pellets takes place in a vertically elongated shaft furnace. This presents no difficulty since the pellets are of uniform size; and, since they do not disintegrate upon reduction, they feed well in the furnace, are not subject to "hanging up" on the furnace walls, and permit an even contact of the reducing gases with all parts of the charge above the reaction zone. The shaft furnace has a temperature gradient from a central hot zone toward both the top and the bottom of the shaft. The reduction is accomplished primarily in the hot zone where the temperature is substantially within the range of 1300° F. to 1800° F. With a residence time of approximately three hours (which is rather widely variable depending upon various conditions including the reducing power of the gas, the gas flow rate, and the like) a high degree of reduction can be achieved in the pellets. The process herein described has the advantage of being continuous in character, i.e., the pellets are fed in at the top of the shaft, and the furnace is capable of delivering reduced pellets continuously at a rate dependent upon the size of the furnace and the desired residence time therein.

It is a basic object of this invention to attain greater fuel efficiency and lower costs of operation in a process of the type which is later outlined.

It is an object of the invention to provide improvements in furnace design and construction for the purpose set forth.

It is an object of the invention to provide a self-contained process in the sense that the economics thereof are not dependent upon the use elsewhere and for other purposes of great quantities of gases generated in the process and containing combustible values.

It is an object of the invention to provide a process and apparatus which is simpler and more economical than those hitherto known in the art.

It is an object of the invention to provide a process and apparatus capable of delivering the reduced pellets in a cooled condition such that they can be withdrawn to the air without substantial oxidation.

These and other objects of the invention which will be set forth hereinafter or will be apparent to one skilled in the art upon reading these specifications, are accomplished by that certain construction and arrangement of parts and in that procedure of which certain exemplary embodiments will now be described. Reference is made to the accompanying drawings wherein:

FIG. 1 is a flow diagram of the process of this invention.

FIG. 2 is a vertical sectional view of an exemplary shaft furnace which can be used in the practice of the invention, associated apparatus being indicated in flow sheet form.

In the practice of this invention, the reducing gas is generated by the partial combustion of natural gas or other suitable mobile fuel with oxygen. The combustion is so carried on that the products thereof will be strongly reducing in character, the reducing gases consisting primarily of hydrogen and carbon monoxide, with some carbon dioxide and water vapor. The quantity of water vapor in the gases as generated will not be sufficient render the gases neutral or oxidizing. The use of oxygen instead of air eliminates to all intents and purposes the presence of inert extraneous gases such as nitrogen. The oxygen may be derived from an oxygen plant indicated at 5, wherein air is liquified and then separated into i.s various components.

The partial combustion of the mobile fuel may be regulated by the operator to strike a proper balance between temperature and reducing potential in the products of combustion. For example, when burning natural gas with oxygen, a methane:oxygen ratio of 1.2 to 1.6 may be found suitable.

The hot reducing gases from the combustion chamber 4 enter the shaft furnace 1 at about its mid-section, and traveling upwardly in countercurrent to the downward travel of the ore pellets, the hot gases heat the pellets to temperatures at which reduction can take place. Reduction can be carried out over a wide temperature range, say substantially 1300° to 1800° F., the higher temperatures being preferred because of the increased rate of reduction. The temperature of the incoming reducing gases may be varied as necessary to obtain any temperature desired within the range. The reducing reaction is generally preferred to take place with the pellets at a temperature between about 1500° F. and 1800° F., although this may be varied as needed to prevent the sticking of some ores.

As the hot reducing gases move upwardly in the heating and reducing section 2 of the shaft furnace, they lose a substantial quantity of their hydrogen and carbon monoxide contents, and they take on water vapor. The lean gases are withdrawn from the top portion of the shaft furnace through a conduit 6 under the influence of a pump 7 and are recirculated while undergoing treatment. The conduit 6 is shown as delivering the gases to a gas washer 8 ahead of the pump, the effect of which is to cool the gases and condense much of the water contained in them. There is also a water separator 9 in the line to remove the condensed water. After the removal of the moisture therefrom, the gases will be found to have been at least partially renewed as to their reducing potential since the relative quantities of hydrogen and carbon monoxide will have become effectively greater as compared with the other components of the gas.

The treated gases leave the water separator 9 in a conduit 10. Provision is made at 11 for bleeding some of the gas from the conduit to compensate for the addition of gases to the closed system, either at the combustion chamber 4, or elsewhere as later described. Gases bled from the system can be used for fuel, either in the oxygen plant or for any other purpose requiring a gaseous fuel.

A relatively small amount of the treated gases in the conduit 10 is taken off by a branch conduit 10a and returned to the connection between the combustion chamber 4 and the furnace. The purpose of this gas is to control the temperature of the gas entering the furnace, for which reason the amount of gases so returned is variable and can be made responsive either to variations in the temperature of the hot gases from the combustion chamber or to variations in the temperature of the mixed gases entering the furnace.

The remainder of the recirculated gases is conducted by branch conduit 10b to the bottom part of the furnace 1, where the gases are delivered to the cooling section 3 of that furnace. It will be understood that while the gases in the top section of the shaft furnace are at a relatively high temperature (although they have lost some of their initial heat in raising the temperature of the ore pellets), the top gases removed from the furnace are lowered in temperature by the gas washer 8 and water separator 9 to a temperature which will be about that of the cooling water available. It follows that if these cooled gases are delivered to section 3 of the shaft furnace, and if this section is of sufficient length, the gases delivered through conduit branch 10b will cool the reduced pellets to such a temperature as will permit their withdrawal to the ambient atmosphere without reoxidation. At the same time the gases will be recovering the heat of the pellets so that, by the time the gases reach the midsection of the furnace where they mix with hot gases from the combustion chamber 4, the recirculated gases will be approaching the temperature of the gases entering the furnace at 21. For a purpose which will later be explained, provision may be made as at 12 for the introduction of some natural gas or similar mobile fuel into the conduit branch 10b.

Referring now to FIG. 2, the mechanical features of an exemplary shaft furnace suitable for the practice of this invention will be explained. In the figure the recirculatory system above described is shown diagrammatically, like index numerals indicating like parts. The shaft furnace 1 comprises a housing 13 and an inner shell member 14 between which there is a filling of insulative material 15. The inner shell 14 has a top section 14a which is a feeding section for the ore pellets. It is provided with a top hopper 14d having a bell 16 operated by a lever arrangement indicated at 20. There is also a lower hopper or baffle 18 having a bell 19 operated by another lever arrangement 17. Iron ore pellets are delivered to the hopper 14d, whence they can be permitted to descend into the feeding section 14a when the bell 16 is opened. The pellets come to rest on the baffle 18 and bell 19 as shown in the drawing. When the bell 16 is closed, the bell 16 is closed, the bell 19 may be opened and the pellets allowed to travel downwardly out of the feeding section 14a into the reducing section 14b of the furnace. This reducing section, as shown, is preferably slightly conical in cross section, tapering upwardly. This tends to eliminate any clogging or hanging up of the iron ore materials on the inner shell 14 of the furnace.

It will be noted that the outer shell 13 is approximately of the same length as the reducing or high temperature section of the shaft furnace and includes the point at which reducing gates are delivered by an insulated conduit 21 to the inner shell of the furnace at about its midsection. The gases are formed in the combustion chamber 4 (which is also insulated as indicated at 22) by the combustion of, say, natural gas with oxygen in a burner 23.

The inner shell of the shaft furnace extends below the outer shell 13 as shown at 14c, so as to form the cooling or heat recovery section for the furnace. The lower part of the heat recovery section enters a casing member 24 and is sealed in gas-tight relationship thereto. The casing 24 contains a rotary table discharger 25 having a shaft 26 which can be rotated by a variable speed motor (not shown). It will be understood by the skilled worker in the art that the accumulation of reduced pellets on the table 25 will block the furnace discharge of pellets from the furnace section excepting to the extent the reduced pellets are removed from the rotating table 25 by a plow 25a.

The reduced pellets may be removed from the casing 24 through a casing means 27 containing two successive flap valves 28 and 29. It will be understood that the action of these valves is to permit withdrawal of the reduced pellets to the atmosphere without permitting entrance of the atmosphere into the system. By the time the pellets reach the valves they will have cooled sufficiently to permit their withdrawal into the air without reoxidation.

Under some circumstances it may be desired to send some refractory balls or other shapes through the shaft furnace along with the ore pellets for the sake of facilitating the passage of gases through the shaft. Where this is done, sepaartion of the refractory elements from the reduced pellets can be easily effected by a magnetic separator roll 30, the reduced pellets being collected at 31 and the refractory shapes at 32.

FIG. 2 is illustrative merely of a type of shaft furnace with which the process of this invention may be practiced. The shape, size and general configuration are not intended to be limiting and may be varied in accordance with the capacity of the furnace.

In FIG. 2 the conduit means 6, the pump 7, the bleed-off connection 11 and the conduits 10, 10b and 12 have been indicated; but the oxygen plant has been omitted for the sake of clarity. It is preferred to introduce some natural gas or other methane containing gas at 12 because it has been found that as the cooled and dried gases entering the cooling section of the furnace pick up heat from the reduced pellets, it is possible to regenerate substantial quantities of carbon monoxide and hydrogen in accordance with the reaction:

$$CO_2 + CH_4 \rightarrow 2\ CO + 2H_2$$

Modifications may be made in the invention without departing from the spirit of it.

The embodiments of the invention in which an exclusive property or privilege is claimed are defined as follows:

1. A process for the gaseous reduction of pelletized iron ores to iron which comprises subjecting said ores to gaseous reduction in a shaft furnace at a temperature of substantially 1300° to substantially 1800° F. in a highly reducing gaseous atmosphere consisting principally of carbon monoxide and hydrogen, said atmosphere being generated by the incomplete combustion of a mobile fuel with oxygen and introduced at about the mid-section of the furnace, withdrawing gases at the top of the furnace into a recirculatory system, cooling the said gases in said system so as to abstract moisture from them, reintroducing said gases into said shaft furnace at a point below the mid-section thereof whereby said cooled gases act to cool the reduced ore pellets, and mixing a quantity of a methane-containing gas with said cooled gases before reintroduction thereof into said shaft furnace whereby said methane-containing gas reacts with some of the carbon dioxide in said cooled gases with the production of carbon monoxide and hydrogen.

2. The process claimed in claim 1 in which the said reduced ore pellets are cooled to a temperature below the temperature of air oxidation before removal from said furnace.

References Cited

UNITED STATES PATENTS

| 2,080,028 | 5/1937 | Avery | 75—34 |
| 2,739,055 | 3/1956 | Gallosser | 75—35 X |
| 2,831,759 | 4/1958 | Osborn | 75—34 X |
| 2,873,183 | 2/1959 | Pike | 75—35 |
| 2,931,720 | 4/1960 | DeVaney | 75—35 |
| 3,063,695 | 11/1962 | DeVaney | 75—35 X |
| 3,189,438 | 6/1965 | VonBogdandy | 75—34 |

DAVID L. RECK, *Primary Examiner.*

H. W. TARRING, *Assistant Examiner.*